No. 644,607. Patented Mar. 6, 1900.
T. E. JOHNSON.
SEED CONVEYER.
(Application filed Dec. 27, 1899.)
(No Model.)
2 Sheets—Sheet 2.
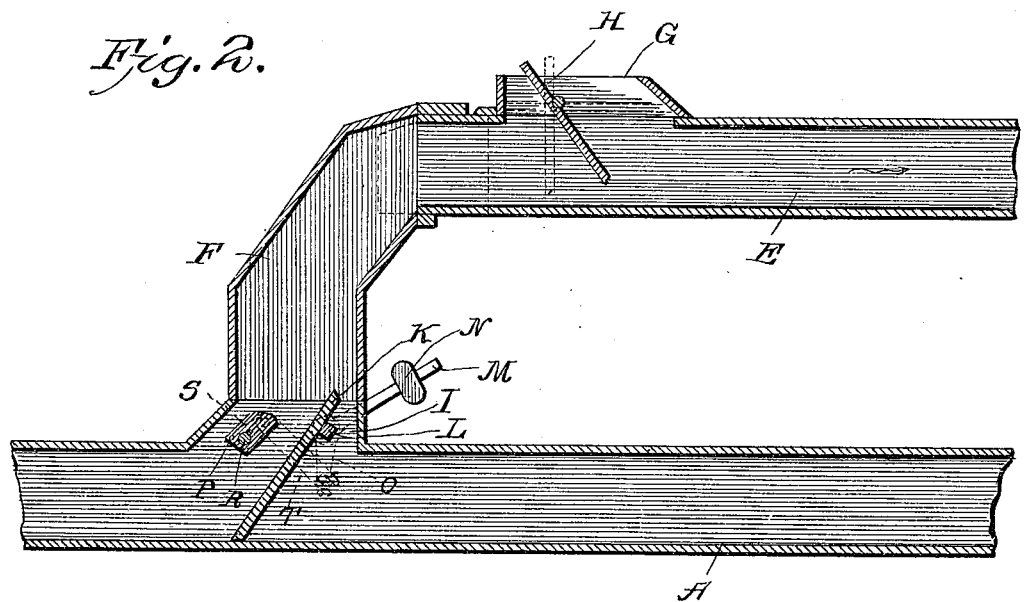
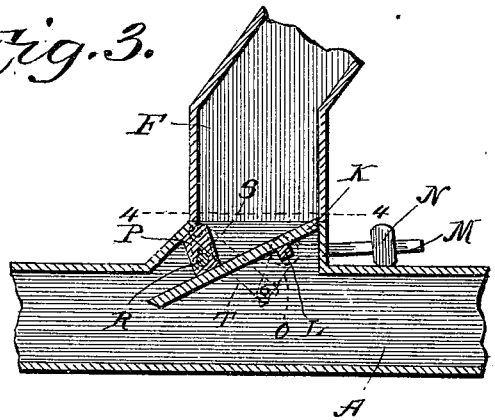
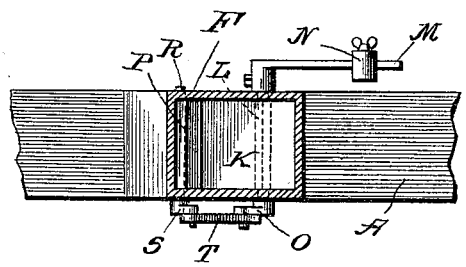
Witnesses
Thomas E. Johnson, Inventor,
By his Attorneys,

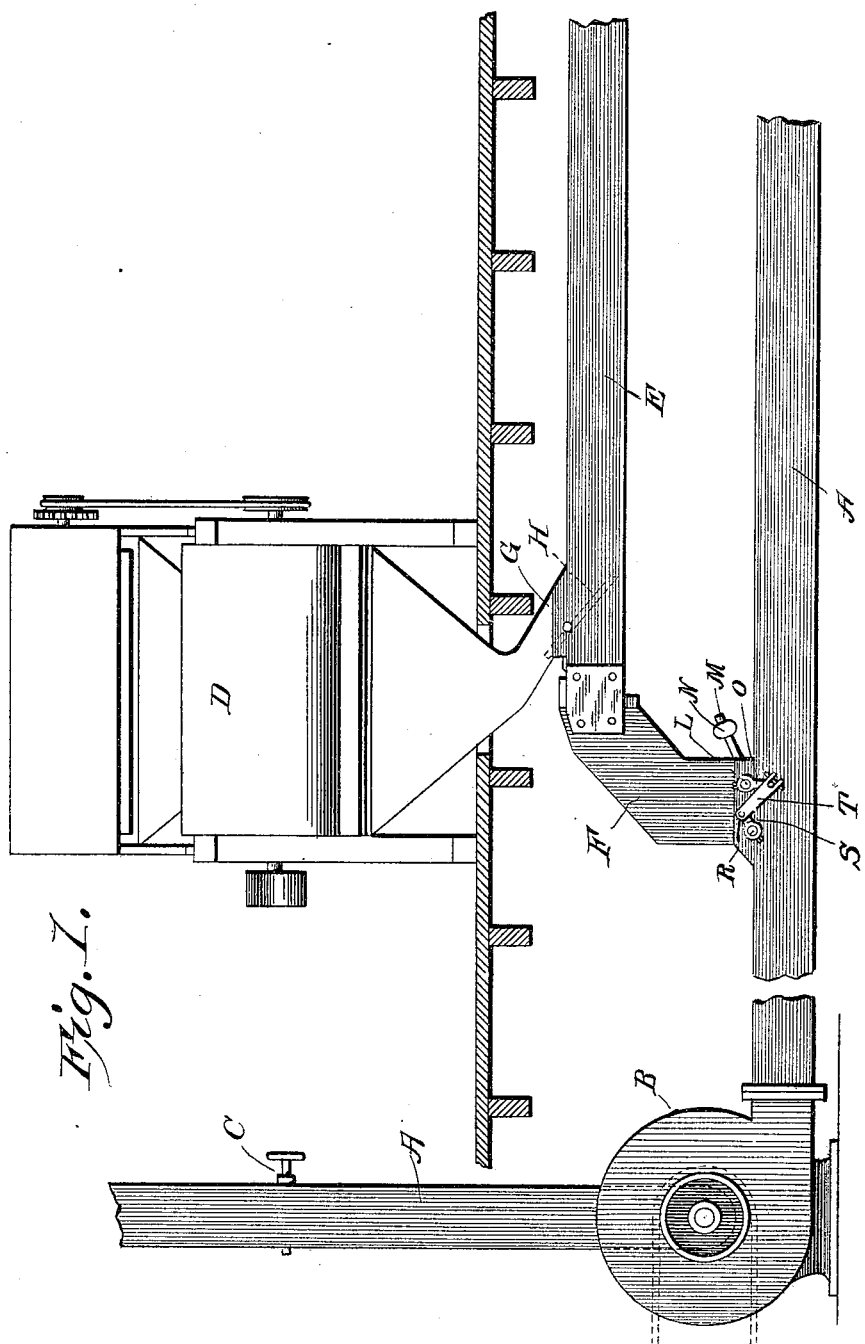

UNITED STATES PATENT OFFICE.

THOMAS E. JOHNSON, OF WEBBERVILLE, TEXAS.

SEED-CONVEYER.

SPECIFICATION forming part of Letters Patent No. 644,607, dated March 6, 1900.

Application filed December 27, 1899. Serial No. 741,741. (No model.)

*To all whom it may concern:*

Be it known that I, THOMAS E. JOHNSON, a citizen of the United States, residing at Webberville, in the county of Travis and State of Texas, have invented a new and useful Seed-Conveyer, of which the following is a specification.

My invention is an improved seed-conveyer to convey cotton-seed, after it has been ginned, from the gin-stand to a hopper or warehouse or receptacle; and one object of my invention is to provide a cotton-seed conveyer which is automatic in its operation and adapted to blow the seeds from the gin-stand through the seed-flue when the valve above the fan is open and to cut off the current of air from the seed-flue when the valve above the fan is closed and cause the current of air to be cut off from the said flue and exhausted from the discharge end of the flue at the tail of the cut-off-valve flue.

A further object of my invention is to provide automatically-operated apparatus to control the current of air during the operation of blowing the cotton-seeds from the gin-stand and to vary the strength thereof accordingly as it may be necessary to increase or diminish the force of the air-current.

To these ends my invention consists in the combination, with the air and seed flues connected together, of the weighted cut-off valve and pressure-valve connected thereto and located in the junction of the said air and seed flues and the pressure-controlled seed-valve in the seed-flue below the gin-stand.

My invention further consists in the peculiar construction and combination of devices hereinafter fully set forth, and particularly pointed out in the claims.

In the accompanying drawings, Figure 1 is a side elevation of a cotton-seed conveyer embodying my improvements and showing the same located in operative position with respect to the gin-stand, fan, and air-valve. Fig. 2 is a longitudinal sectional view of my improved cotton-seed conveyer, showing the cut-off valve and pressure-valve in position to direct the current of air through the seed-flue and illustrating the normally-operative position of the seed-valve. Fig. 3 is a similar view of a portion of my cotton-seed conveyer, showing the cut-off valve and pressure-valve closed, so as to cut off the current of air from the seed-flue. Fig. 4 is a horizontal sectional view taken on the line 4 4 of Fig. 3.

The air-flue A communicates with the case of the fan or blower B, which has a suitable air-valve C located above the fan or blower and in proximity to the gin D.

The seed-flue E, which is preferably arranged in a horizontal position, communicates with the air-flue A through an elbow F. Said seed-flue has an opening G on its upper side, which communicates with the gin-stand, as illustrated in Fig. 1, and pivoted in the said opening is a seed-valve H, the pivotal point of which is some distance from the center thereof, whereby the said seed-valve when the apparatus is not in use normally hangs in a vertical position in the air-flue.

Near one side of the throat of the elbow F, in the opening I of the air-valve, is located a cut-off valve K, which is provided on one end of its pivotal shaft L with an adjusting balance-arm M, on which is a weight N, that is capable of being adjusted on said arm, the said weight serving to normally close the said cut-off valve and maintain it in the position shown in Fig. 3. To the opposite extremity of the pivotal shaft of the cut-off valve K is attached a crank-arm O. A pressure-regulating valve P is located in the opening I and is adapted to close said opening, in connection with the cut-off valve. The pivotal shaft R of said regulating-valve is located at the lower side of said seed-valve, and at one end of said shaft is a crank S, which is connected to the crank O of the cut-off valve by a link T. The said cut-off valve and pressure-regulating valve being thus connected together are adapted to work in unison.

The operation of my device is as follows: When the air-valve C above the fan is closed and the current through the air-flue diminishes in force, the connected cut-off valve K and pressure-regulating valve P are caused to close the opening I by means of the weight N and the air is exhausted through the air-flue. When it is desired to convey cotton-seeds from the gin-stand to the hopper, storehouse, or other receiver, the air-valve C is opened, thereby increasing the force of the current of air in the flue A, the said current taking the direction through said flue indicated by the arrow in Fig. 3. It will be observed by reference to said Fig. 3 that the lower portion of the cut-off valve while the same is closed is exposed to the force of the said current of air, which causes said cut-off valve to open to the position shown in Fig. 2, the pressure-regulating valve moving simultaneously with said cut-off valve, and thereby opening communication between the seed-flue and the air-flue and cutting off the discharge of air from the tail of the air-flue. Said current of air being thus directed into and through the seed-flue, which is in communication with the gin-stand, a partial vacuum is created in the gin-stand, thereby causing the cotton-seeds in the gin-stand to be discharged therefrom through the opening G into the seed-flue and to be blown through said flue into the hopper, storehouse, or other receiver.

The seed-valve H serves to regulate the discharge of the cotton-seeds through the seed-flue by controlling the force of the current of air in said seed-flue, and the pressure-regulating valve P, in connection with the cut-off valve, serves to maintain a current of constant strength in the seed-flue. When the current of air diminishes in force so that it is no longer sufficient to raise the weight N, said weight and the connections between the cut-off valve and the pressure-regulating valve close the said valves to the initial position shown in Fig. 3.

A seed-conveyer thus constructed is exceedingly cheap and simple, is automatic in its operation, and is adapted to be controlled by the gin operator at will.

Having thus described my invention, what I claim is—

1. In a cotton-seed conveyer, the combination with the air and seed flues communicating with each other, of the cut-off valve and pressure-valve connected thereto and operated thereby, said cut-off valve and pressure-valve being located in the elbow or opening between said air and seed flues, for the purpose set forth, and the pressure-controlled seed-valve in the seed-flue, substantially as described.

2. The combination, in a cotton-seed conveyer, of the air-flue, the cut-off valve and pressure-valve therein, connections between said valves, whereby they are operated simultaneously, and the adjustable balancing-weight for the cut-off valve, with the seed-flue communicating with the air-flue at the point where the cut-off valve and pressure-valve are located, said seed-flue having the opening adapted to communicate with a gin-stand, and being further provided with a seed-valve, substantially as described.

3. In a cotton-seed conveyer, the combination with the communicating air and seed flues, of the counterbalanced cut-off valve, the pressure-regulating valve, said valves being each provided with a crank-arm and the link connecting said crank-arms, substantially as described.

In testimony that I claim the foregoing as my own I have hereto affixed my signature in the presence of two witnesses.

THOMAS E. JOHNSON.

Witnesses:
THOMAS DOWNS,
J. R. CARPENTER.